(12) United States Patent
Lee et al.

(10) Patent No.: US 11,494,015 B2
(45) Date of Patent: Nov. 8, 2022

(54) DISPLAY PANEL AND MANUFACTURING METHOD THEREOF

(71) Applicant: LG Display Co., Ltd.

(72) Inventors: Dahee Lee, Paju-si (KR); Changlok Hur, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 34 days.

(21) Appl. No.: 17/123,951

(22) Filed: Dec. 16, 2020

(65) Prior Publication Data

US 2021/0200359 A1 Jul. 1, 2021

(30) Foreign Application Priority Data

Dec. 31, 2019 (KR) .................. 10-2019-0179721

(51) Int. Cl.
*G06F 3/041* (2006.01)

(52) U.S. Cl.
CPC .. *G06F 3/0412* (2013.01); *G06F 2203/04103* (2013.01)

(58) Field of Classification Search
CPC combination set(s) only.
See application file for complete search history.

(56) References Cited

U.S. PATENT DOCUMENTS

| 2014/0118277 A1 | 5/2014 | Kim et al. |
| 2019/0196240 A1* | 6/2019 | Chung .................. G06F 3/0416 |
| 2019/0332241 A1* | 10/2019 | Wang .................. G06F 3/04164 |

FOREIGN PATENT DOCUMENTS

| KR | 10-2008-0062569 A | 7/2008 |
| KR | 10-2014-0054739 A | 5/2014 |

* cited by examiner

*Primary Examiner* — Robin J Mishler
(74) *Attorney, Agent, or Firm* — Morgan, Lewis & Bockius LLP (57) ABSTRACT

A display panel and a manufacturing method thereof are proposed. A display panel may include: a touch electrode provided to supply a common voltage through an electrode; a first signal line connected to the touch electrode and provided to supply the common voltage applied by a driving IC to the touch electrode; a plurality of dummy lines provided to be connected to the touch electrode; and a switching transistor provided to supply the common voltage to a second signal line by being switched by an applied VCOM enable signal, wherein the second signal line is configured to supply the common voltage to the touch electrode.

16 Claims, 10 Drawing Sheets

DISPLAY PANEL AND MANUFACTURING METHOD THEREOF

CROSS-REFERENCE(S) TO RELATED APPLICATIONS

This application claims the benefit of Korean Patent Application No. 10-2019-0179721 filed on Dec. 31, 2019, the entire contents of which is incorporated herein by reference for all purposes as if fully set forth herein.

BACKGROUND

Technical Field

The present disclosure relates to a display panel and a manufacturing method thereof.

Discussion of the Related Art

Recently, application fields of display devices have been expanded not only to electronics such as mobile phones, TVs and monitors, but also to household appliances such as refrigerators. Types of the display devices include a liquid crystal display (LCD), an organic light emitting diode (OLED) display, etc.

In recent years, by replacing the input device such as a mouse or a keyboard that has been applied in the related art, a touch screen that directly inputs information on a screen by a touch of a finger or a pen has been applied. Application of touch screens has been expanded, because of an advantage of ease of operability.

Depending on structures, the touch screen may be divided into an in-cell method having integrated in a cell of the touch panel, an on-cell method formed on an upper part of the touch panel, and an add-on method in which the touch screen is separately coupled to an upper part of the display device. The in-cell method, which has advantages of aesthetics and slimness, has attracted attention.

Due to structural properties in which a plurality of touch blocks capable of sensing a user's touch are inserted into the display panel, and pixels for displaying and the touch blocks for touch sensing are provided together, the in-cell method drives displaying and touch sensing in a time division manner. For example, a touch electrode which is a component of the touch block serves as a touch electrode at a touch sensing time or as a common electrode at a display time in the time division manner.

In the display time, since the touch electrode functions as the common electrode, an electrode line for supplying a common voltage to the touch electrode is required. Since a driving chip such as a data driver IC that supplies the common voltage has a limit of its voltage supply channel, a common voltage electrode line is provided for each touch block in general. The touch block is provided so that the given common voltage electrode line is connected to the touch electrode, and the common voltage propagates in the touch electrode.

Materials such as ITO composing the touch electrode have a higher resistance than metal. In a process in which a common voltage is applied to some areas of the touch electrode and propagated to the remaining areas, a resistance difference occurs depending on areas on the touch electrode, and thus there is a problem in that the common voltage is not uniformly applied to the touch electrode and voltage imbalance occurs. As a result, when outputting video, there may be a problem in that luminance is not uniform.

SUMMARY

Accordingly, embodiments of the present disclosure are directed to a display panel and a method of manufacturing the same that substantially obviate one or more of the problems due to limitations and disadvantages of the related art.

In order to solve a common voltage imbalance phenomenon occurring in the touch electrode, various exemplary embodiments provides a display panel and a manufacturing method thereof, the display panel having a plurality of signal lines that provides a common voltage to a touch electrode.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, a display panel comprises: a touch electrode provided to supply a common voltage; a first signal line connected to the touch electrode and provided to supply the common voltage applied by a driving IC to the touch electrode; a plurality of dummy lines provided to be connected to the touch electrode; and a switching transistor provided to supply the common voltage to a second signal line by being switched by an applied VCOM enable signal, wherein the second signal line is configured to supply the common voltage to the touch electrode.

In another aspect, a manufacturing method of a display panel comprises: providing a touch electrode provided to supply a common voltage through an electrode; providing a first signal line connected to the touch electrode and provided to supply the common voltage applied by a driving IC to the touch electrode; providing a plurality of dummy lines provided to be connected to the touch electrode, and providing a switching transistor provided to supply the common voltage to a second signal line by being switched by an applied VCOM enable signal, wherein the second signal line is configured to supply the common voltage to the touch electrode.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain principles of the disclosure. In the drawings.

DETAILED DESCRIPTION

Hereinafter, various exemplary embodiments will be described with reference to the drawings. In this specification, when a first component (or area, layer, part, etc.) is referred to as being "on", "connected to", or "coupled with" a second component, it means that the first component can be directly connected to/coupled to the second component, or a third component can be disposed between the first and second components.

The same reference numerals refer to the same components. In addition, in the drawings, the thickness, proportion, and dimensions of the components are exaggerated for effective description of the technical content. "And/or" includes all combinations of one or more of which the associated configurations may be defined.

Although the terms "first", "second", etc. may be used herein to describe various components, these components should not be limited by these terms. These terms are only used for the purpose of distinguishing one element from another element. For example, the first element may be referred to as a second element without departing from the scope of the various exemplary embodiments, and similarly, the second element may be referred to as a first element. As used herein, the singular forms are intended to include the plural forms as well, unless the context clearly indicates otherwise.

The terms "below", "on a lower side", "above", "on an upper side", etc. are used to describe the association of the components shown in the drawings. The terms are relative concepts and are explained based on the directions indicated in the drawings.

It will be further understood that the terms "comprise", "include", "have", etc. specify the presence of stated features, integers, steps, operations, elements, components, and/or combinations of them but do not preclude the presence or addition of one or more other features, integers, steps, operations, elements, components, and/or combinations thereof.

In addition, hereinafter, the touch block mainly refers to a unit sensor or an area of the unit sensor that senses a touch input, and the touch electrode mainly refers to a layer to which a common electrode is applied at a display time in the touch block, but the touch electrode may be referred to as an area of the touch block, and in this case, those skilled in the art may clearly understand its meaning according to context.

Figure 1:
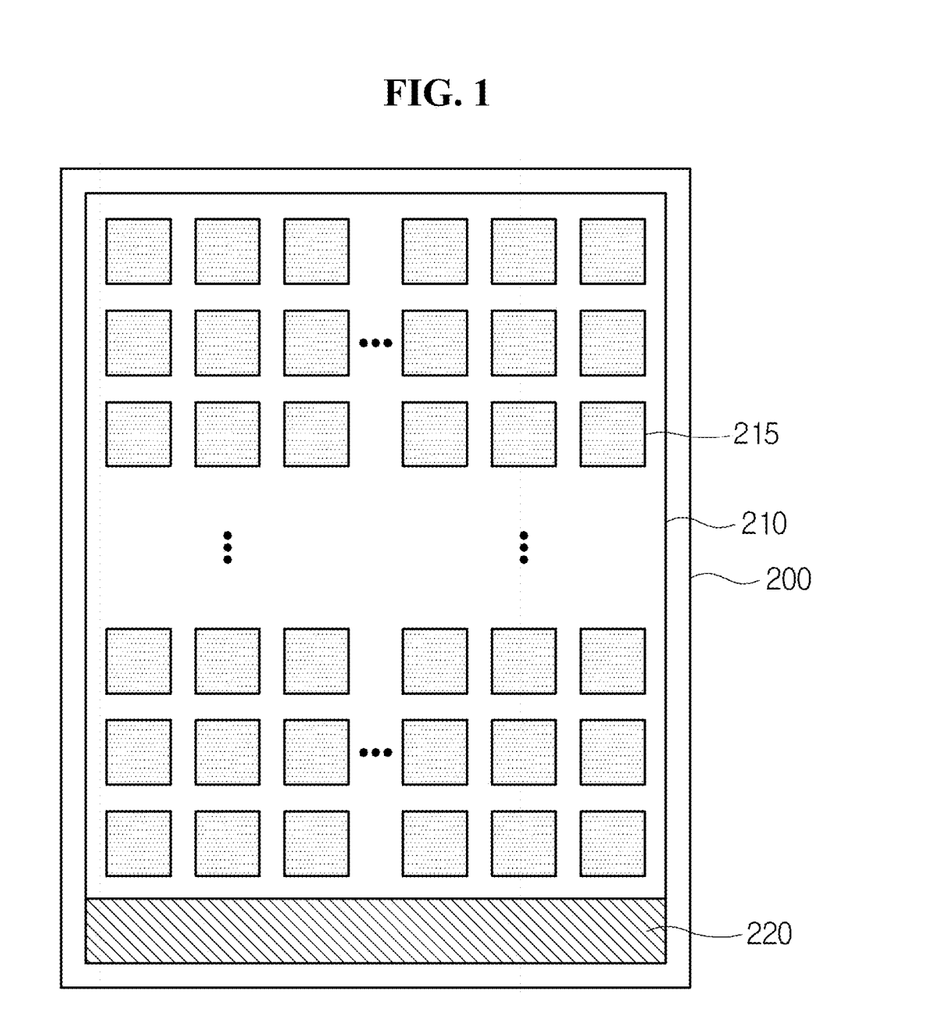
FIG. 1 is a view showing a display panel according to an exemplary embodiment.

FIG. 1 is a view showing a display panel according to an exemplary embodiment. The display panel 200 is a panel capable of outputting an image according to an input digital signal. For example, the display panel 200 may be a liquid crystal panel (LCD). The display panel 200 may be a component of a TV, a monitor, or a mobile phone.

The display panel 200 may include a display area 210 and a non-display area 220. In the display area 210, a plurality of pixels is arranged, and in the non-display area 220, a circuit and an element for performing an ancillary function or supplying a signal to the display area 210 may be disposed.

A plurality of touch electrodes 215 may be arranged in the display area 210. A single touch electrode 215 includes a plurality of pixels to provide a touch block. In the case of an in-cell type touch screen, a block is provided by inserting a touch electrode 215 for touch sensing into a multi-layer structure of a display panel. The touch electrode 215 is driven in a time division manner, and serves as an electrode for driving a pixel in the display period, or serves as a touch sensor in the touch period.

Figure 2:
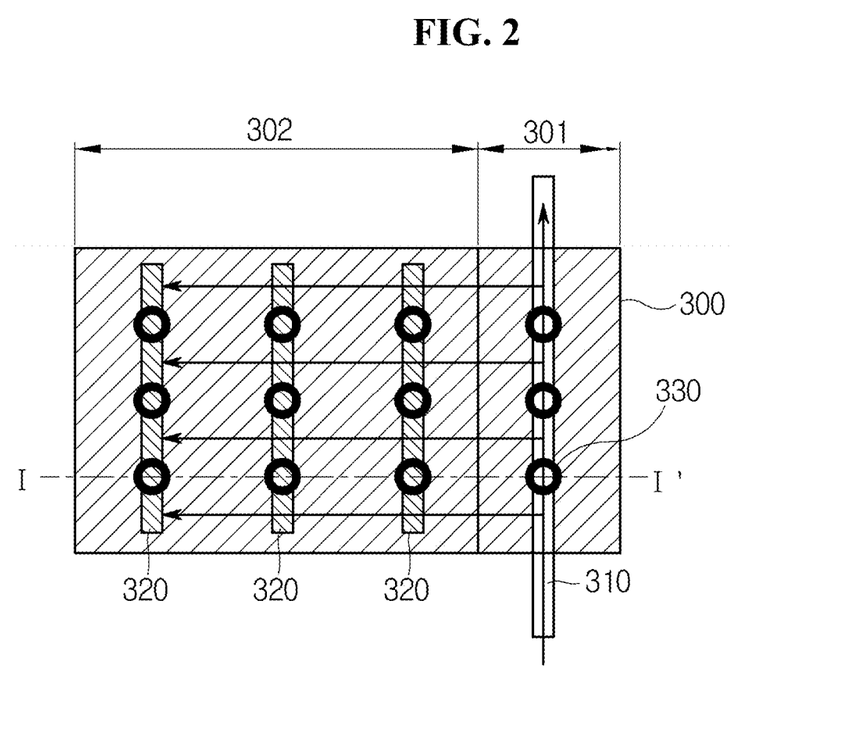
FIG. 2 is a view showing a touch electrode according to the exemplary embodiment.
Figure 3:
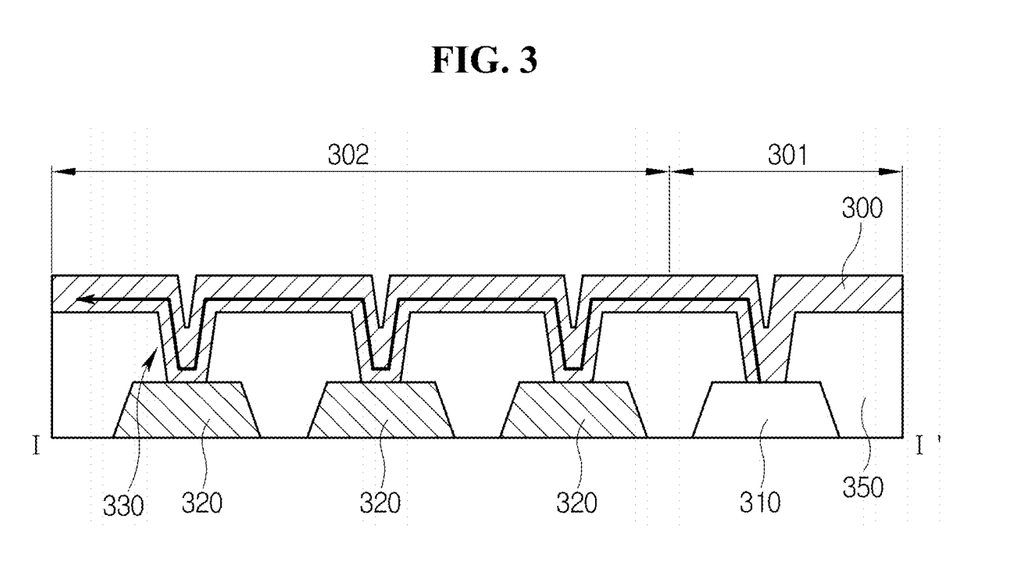
FIG. 3 is a cross-sectional view taken along line I-I' of FIG. 2.

FIG. 2 is a view showing a touch electrode according to the exemplary embodiment. FIG. 3 is a cross-sectional view taken along line I-I' of FIG. 2.

The touch electrode 300 is a component to sense a user's touch input. The touch electrode 300 may be provided with a touch driving signal in the touch period to sense a position of the user's touch. The touch electrode 300 may be connected to a driving IC through a signal line 310. Here, the driving IC includes a touch drive IC, and may include at least one of a data drive IC, a gate drive IC, and a timing controller to compose a single IC.

In the display period, an image may be displayed by supplying a common voltage to the touch electrode 300. That is, in the display period, the touch electrode 300 may serve as the common electrode for driving the pixels. Hereinafter, the description will be mainly focused on a composition for supplying the common voltage to the touch electrode in the display period.

In order to provide the common voltage to the touch electrode 300, a signal line 310 to provide the common voltage from the driving IC is required. A dummy line 320 may be provided at the lower part of the touch electrode 300. The dummy line 320 may correspond to the signal line 310, but may not be connected to the driving IC. The dummy line 320 allows a light transmission area of the panel to be formed in the same pattern on the panel. Therefore, image quality output through the panel may be improved.

In providing a common voltage to the touch electrode through the signal line 310, it is difficult to input the common voltage through several lines due to a limit of the channel of the driving IC. Therefore, the common voltage may be applied to each touch electrode 300 through a single signal line 310. The touch electrode 300 may be divided into an electrode area 301 that is an upper area of the signal line 310 and a dummy area 302 that is an upper area of the dummy line 320.

In the touch electrode 300, a common voltage is directly applied to the electrode area 301 from the signal line 310, and the common voltage is transmitted to the dummy area 302 through the touch electrode 300. The common voltage may be transmitted to be supplied to the whole on the touch electrode 300 composed of a conductive layer such as ITO. Here, the common voltage may also be transmitted to the dummy area 302 and the common voltage may also be provided on the dummy line 320 of the dummy area 302 through a contact hole 330. Here, the contact hole 330 refers to a hole or an electrode provided in the hole formed to provide an electrical connection between the touch electrode 300, which is spaced apart by an insulating layer 350, and the signal line 310 or the dummy line 320.

However, in the electrode area 301 to which the common voltage is directly applied by the signal line 310 and in the dummy area 302 to which the common voltage is transmitted through the touch electrode 300, there occurs a difference in the common voltage applied to the touch electrode 300. This difference may be caused by resistance of the touch electrode 300 including the ITO and the like, the contact hole 330, and the dummy line 320. As a result, the common voltage is not uniformly provided in the whole touch electrode 300. Consequently, luminance imbalance may occur between a plurality of pixels in the touch block. The electrode area 301 becomes brighter or darker than the dummy area 302, and thus a difference in brightness appears on the display and a vertical white line may also be appeared.

Hereinafter, according to various exemplary embodiments, a display panel including a plurality of signal lines will be described in detail in order to resolve the luminance imbalance.

Figure 4:
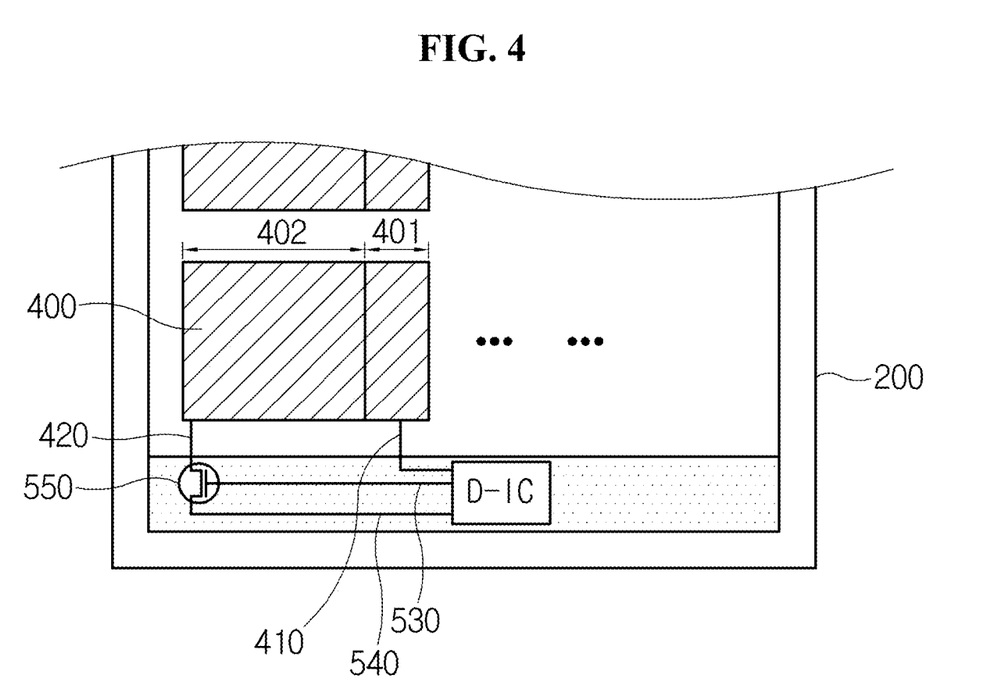
FIG. 4 is a view showing a driving circuit of the display panel according to an exemplary embodiment.
Figure 5:
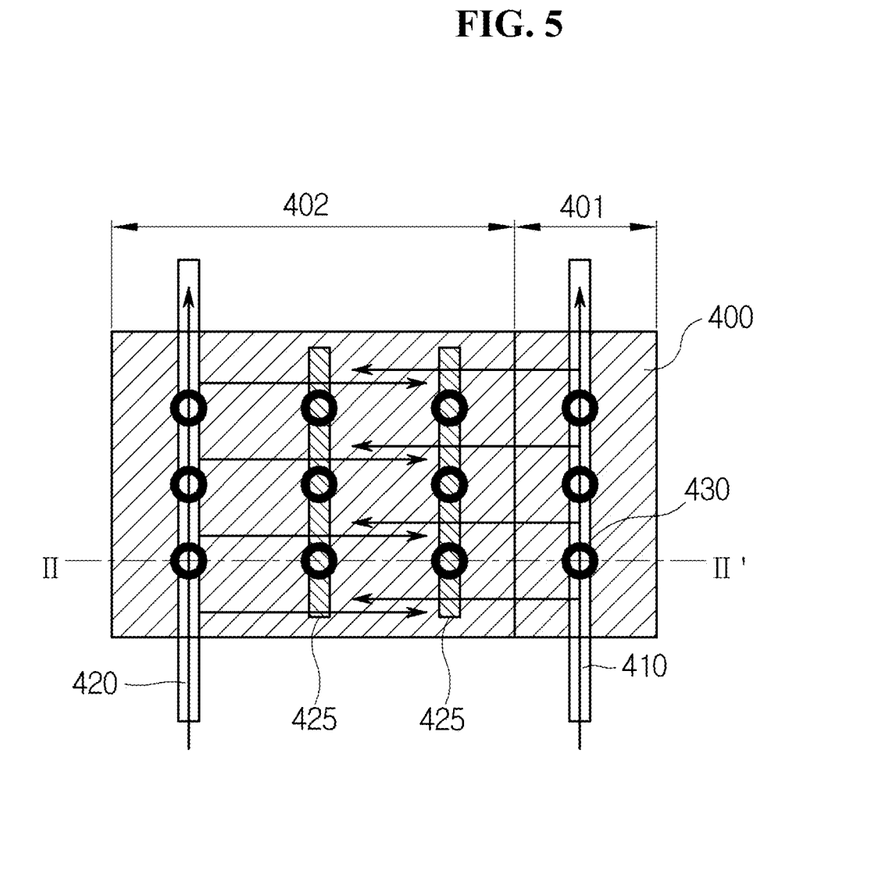
FIG. 5 is a view showing the touch electrode according to the exemplary embodiment.
Figure 6:
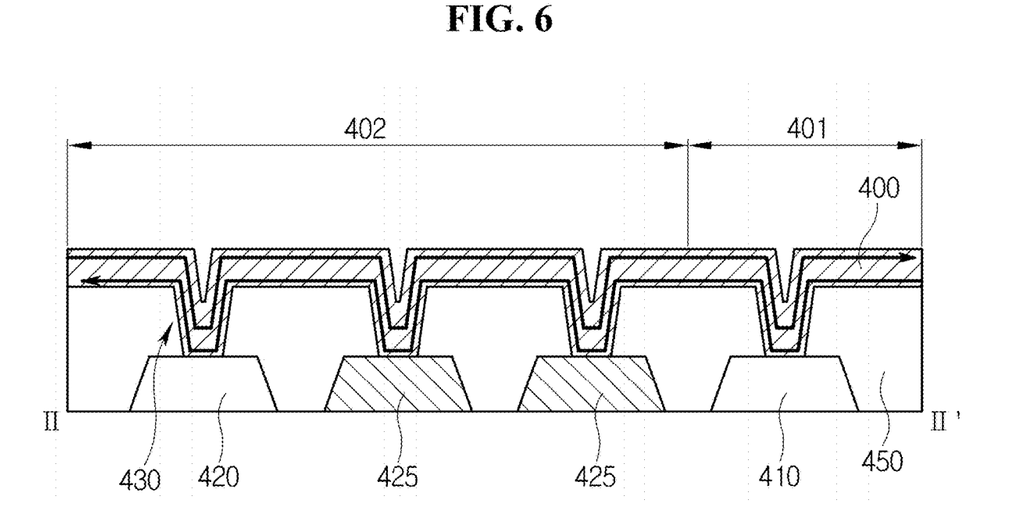
FIG. 6 is a cross-sectional view taken along line II-II' of FIG. 5.

FIG. 4 is a view showing a driving circuit of a display panel according to an exemplary embodiment. FIG. 5 is a view showing a touch electrode according to the exemplary embodiment. FIG. 6 is a cross-sectional view taken along line II-II' of FIG. 5.

Referring to FIGS. 4 to 6, a display panel in an exemplary embodiment may include a plurality of signal lines for applying a common voltage to a single touch electrode 400. A first signal line 410 and a second signal line 420 may be included as the plurality of signal lines providing the common voltage to the touch electrode 400. The first signal line 410 and the second signal line 420 may be connected to the touch electrode 400 through a contact hole 430. The contact hole 430 refers to a hole or an electrode provided in the hole formed to provide an electrical connection between the touch electrode 400, which is spaced apart by an insulating layer 450, and the first signal line 410 or the second signal line 420.

The second signal line 420 may be connected to a switching transistor 550 that is switched by a signal to supply a common voltage. The second signal line 420 is applied with the common voltage from the switching transistor 550, and the applied common voltage may be applied to the touch electrode 400.

The gate electrode of the switching transistor 550 is connected to a VCOM enable line 530, so that the switching transistor 550 may be turned on depending on a VCOM enable signal applied to the VCOM enable line 530. The VCOM enable signal may be provided by a driving IC, D-IC. The source electrode of the switching transistor 550 is connected to a VCOM line 540, and when the switching transistor 550 is turned on, the common voltage may be applied from the VCOM line 540 to the second signal line 420. Accordingly, the common voltage may be applied to the touch electrode from the first signal line 410 as well as the second signal line 420.

In various exemplary embodiments of the present disclosure, a plurality of lines providing the common voltage may be composed to solve a conventional problem in which the common voltage is not uniformly supplied. Since the common voltage is not propagated in one direction from the first signal line, but is transmitted in various directions, it is possible to alleviate the common voltage imbalance in the touch electrode.

In the exemplary embodiment, the second signal line 420 may be at least one of a plurality of dummy lines 425.

Here, the dummy line 425 is prepared for improving image quality in the touch block. A plurality of pixels may be disposed in a touch block. When outputting an image, the pixel in the area where the first signal line 410 is disposed and the pixel in the area where the first signal line 410 is not disposed may have an image quality difference due to a pattern difference in the light transmission area. In order to solve the image quality difference problem, the dummy line 425 is disposed in the same way as the first signal line 410, whereby the light transmission area may be formed in the same pattern for the pixels in the touch block to improve the output image quality. Some or all of the dummy line 425 may not be connected to the driving IC.

In the display panel according to the exemplary embodiment, the plurality of dummy lines 425 may be provided in parallel with the first signal line 410. In this case, the touch electrode may include an electrode area 401 that is an upper part of the first signal line 410 and a dummy area 402 that is an area other than the electrode area 401. Here, the second signal line 420 may be provided in the dummy area 402.

When dividing the touch electrode 400 into the electrode area 401 and the dummy area 402, a part in which luminance imbalance occurs is the part near the electrode area 401, which is the area where the first signal line 410 contacts. The luminance imbalance appears due to the difference in the common voltage between the electrode area 401 to which the common voltage is directly supplied and the dummy area 402 to which the common voltage is supplied through the touch electrode 400. Therefore, when the second signal line 420 is provided in the dummy area and the common voltage is provided through the second signal line 420, the common voltage is uniformly provided on the touch electrode 400 so as to improve the luminance imbalance due to variations in the common voltage.

Further, the second signal line 420 is provided in one of the areas where the touch electrode 400 is divided into two parts to be parallel to the first signal line 410, and the first signal line 410 may be provided in the other area of the areas divided into two parts. In order to uniformly provide the common voltage on the touch electrode 400, signal lines may be respectively provided in each of the areas where the touch electrode 400 is divided into two parts. Preferably, the first signal line 410 and the second signal line 420 are in parallel, and the touch electrode 400 may be divided into two parts to be in parallel with the first signal line 410 and the second signal line 420. In the arrangement of the first signal line 410, the dummy line 425, and the second signal line 420, various arrangements other than the exemplary embodiment are possible, and the arrangement is not limited to the exemplary embodiment.

The display panel according to the exemplary embodiment includes: a touch electrode 400 provided to supply a common voltage through an electrode; a first signal line 410 connected to the touch electrode 400 and provided to supply the common voltage, applied by a driving IC, to the touch electrode 400; a plurality of dummy lines 425 provided to be connected to the touch electrode 400; and a switching transistor 550 provided to supply the common voltage to a second signal line 420 by being switched by an applied VCOM enable signal, wherein the second signal line 420 may provide the common voltage to the touch electrode 400. The second signal line 420 may include at least one of the plurality of dummy lines 425.

In the exemplary embodiment, the touch electrode 400 may provide the common voltage to the display panel at the display time. Taking an LCD panel as an example, arrangement of a liquid crystal is adjusted depending on electric field provided by a data voltage supplied to a pixel electrode and a common voltage supplied to a common electrode, and transmittance of light emitted from a backlight unit is controlled by adjusting the arrangement of the liquid crystal so as to display an image. A certain number of pixels are composed of one touch block, and a touch screen is provided with a plurality of touch blocks. At this time, the common electrode of the pixels composing a single touch block may be connected to each other to provide the touch electrode 400.

In the exemplary embodiment, the first signal line 410 may be connected to the touch electrode 400. The first signal line 410 may provide the common voltage applied by the driving IC D-IC to the touch electrode 400.

In the exemplary embodiment, the driving IC D-IC may provide the common voltage to the first signal line 410. The driving IC includes the touch drive IC, and may be composed of a single IC including at least one of the data drive IC, the gate drive IC, and the timing controller. The driving IC D-IC may be controlled by the timing controller. The driving IC D-IC may provide the VCOM enable signal and/or the common voltage to the switching transistor 550. The switching transistor 550 may supply the common voltage to the second signal line 420 by being switched by the VCOM enable signal applied from the driving IC D-IC. The driving IC D-IC may provide the common voltage to the touch electrode 400 through a plurality of signal lines including the first signal line 410.

In the exemplary embodiment, the display panel may include a plurality of dummy lines 425. The dummy line 425 is as described above. In the exemplary embodiment, one of the plurality of dummy lines is used as the second signal line 420, whereby a process for generating additional electrodes and contact holes may not be required. Therefore, according to the exemplary embodiment, while adding the second signal line 420, it is possible to minimize the addition or change of the process.

In the exemplary embodiment, the second signal line 420 is connected to the touch electrode 400, and the second signal line 420 may be made of a conductive material. The second signal line 420 may provide the applied common voltage to the touch electrode 400. In the exemplary embodiment, the second signal line 420 may be at least one of the plurality of dummy lines 425. A plurality of second signal lines 420 may be composed. The second signal line 420 may be composed at various positions, and this is as described above.

In the exemplary embodiment, the display panel may include the switching transistor 550. In the exemplary embodiment, the switching transistor 550 may supply the common voltage to the second signal line 420 by being switched by the applied VCOM enable signal. Here, the applied VCOM enable signal and the common voltage may be applied from the driving IC D-IC, or according to another exemplary embodiment, an applied VCOM enable signal and a common voltage may be applied from an auto probe unit (APU) used for inspecting an array of display panels.

In more detail, the gate electrode of the switching transistor 550 and the driving IC D-IC may be connected to each other so that the VCOM enable signal is applied from the driving IC D-IC. In addition, in order that the common voltage with which the switching transistor 550 supplies to the second signal line 420 is to be applied from the driving IC D-IC, the source electrode of the switching transistor 550 and the driving IC D-IC may be connected to each other.

Figure 7:
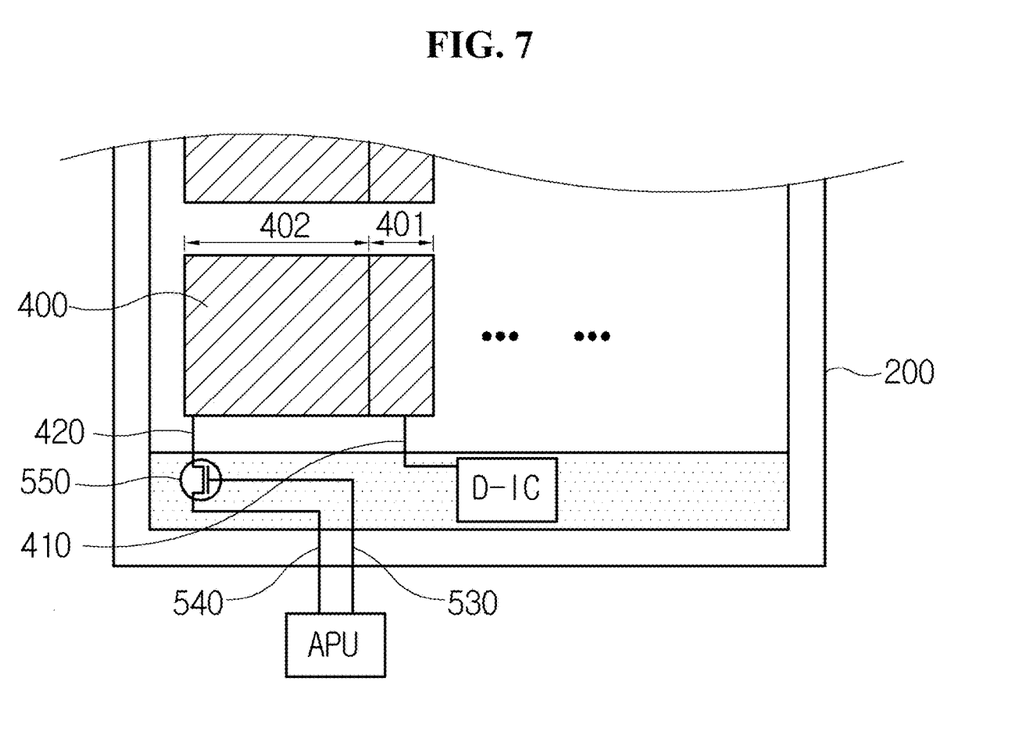
FIG. 7 is a circuit diagram during an auto probe (AP) array inspection of the display panel according to an exemplary embodiment.

FIG. 7 is a circuit diagram during an auto probe (AP) array inspection of a display panel according to an exemplary embodiment.

After manufacturing of a display panel in which a touch screen function and a display function are integrated is completed, the display panel may be inspected for the array by an auto probe array inspection method using the auto probe unit (APU). In the auto probe array inspection method, an array inspection for a display may be performed by supplying a common voltage and a data voltage to all touch electrodes. In the display period, all the same common voltage is supplied to the whole touch electrodes 400 and RGB data is supplied depending on the displayed image to check whether the display is normally driven.

A manufacturing method of a display panel according to the exemplary embodiment may include inspecting an array of the display panel. The manufacturing method of the display panel according to the exemplary embodiment may include: applying the VCOM enable signal from the auto probe unit that inspects the array of the display panel; and applying the common voltage supplied from the auto probe unit to the second signal line 420 by the switching transistor 550. By performing such an auto probe array inspection, it is possible to check whether the display function of each pixel is operated normally.

In the exemplary embodiment, the second signal line 420 may be used as an AP line during the auto probing array inspection. That is, at least one dummy line may be used as the second signal line 420. The second signal line 420 may supply the common voltage to the touch electrode 400 in the display period. In addition, the second signal line 420 may be used as an array inspection line during the auto probing array inspection. According to the exemplary embodiment, a plurality of signal lines may be disposed to improve luminance imbalance and maximally reduce the process of adding separate lines.

Figure 8:
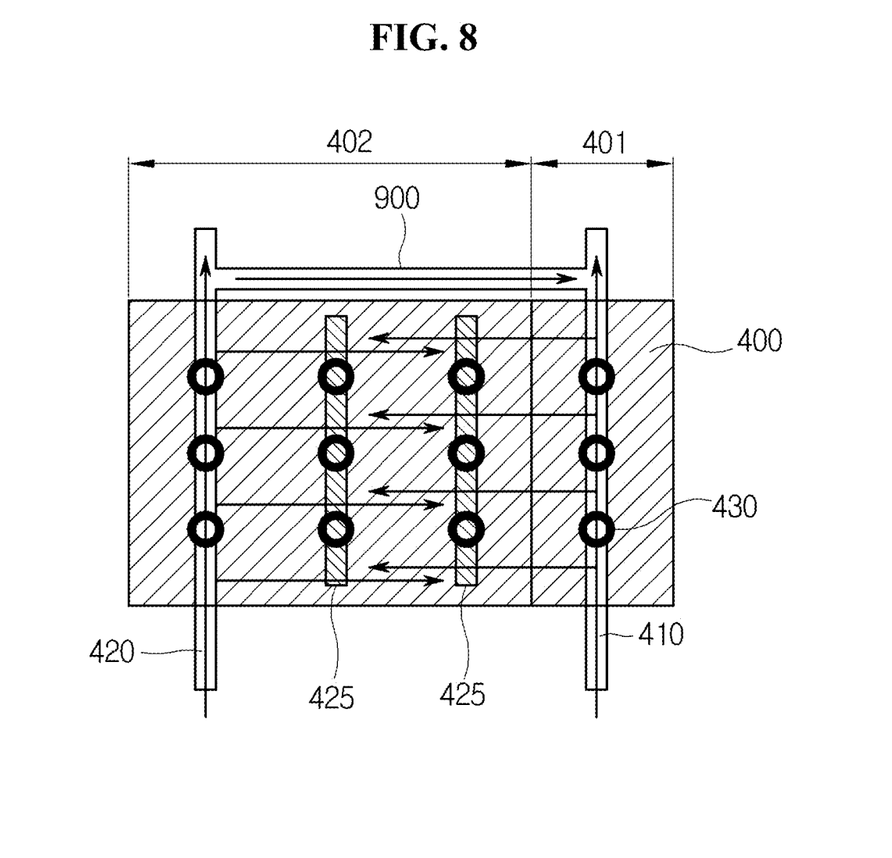
FIG. 8 is a view showing the touch electrode according to the exemplary embodiment.

FIG. 8 is a view showing a touch electrode according to the exemplary embodiment.

According to another exemplary embodiment, a second signal line 420 may include a connection line 900 connected to a first signal line 410. By adding a connection line 900, the difference between common voltages provided by the first signal line 410 and the second signal line 420 may be alleviated. When the connection line 900 is connected to a touch electrode 400, the number of signal lines providing the common voltage increases. Therefore, the common voltage applied to the touch electrode 400 may be more uniform, and the luminance imbalance due to variations in the common voltage may be further improved.

Figure 9:
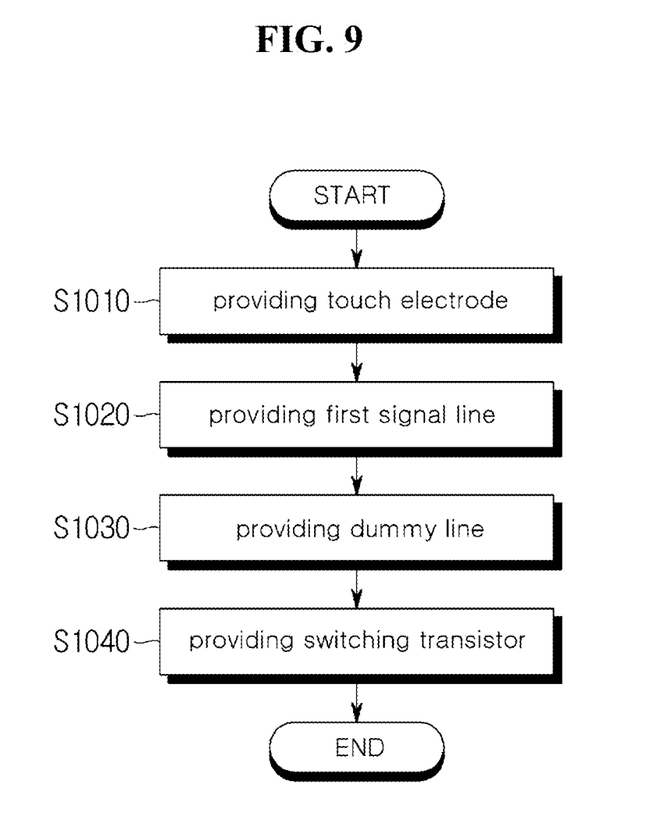
FIG. 9 is a flowchart showing a manufacturing method of a display panel according to the exemplary embodiment.

FIG. 9 is a flowchart showing a manufacturing method of a display panel according to the exemplary embodiment. The manufacturing method of the display panel according to the exemplary embodiment includes: providing a touch electrode provided to supply a common voltage through an electrode, in S1010; providing a first signal line connected to the touch electrode and provided to supply the common voltage applied by a driving IC to the touch electrode, in S1020; providing a plurality of dummy lines provided to be connected to the touch electrode, in S1030; and providing a switching transistor provided to supply the common voltage to the second signal line by being switched by the applied VCOM enable signal, in S1040, wherein the second signal line may provide the common voltage to the touch electrode. The second signal line may be at least one of the plurality of dummy lines. The manufacturing method of the display panel according to the exemplary embodiment is not limited to an order in which each component is provided.

Figure 10:
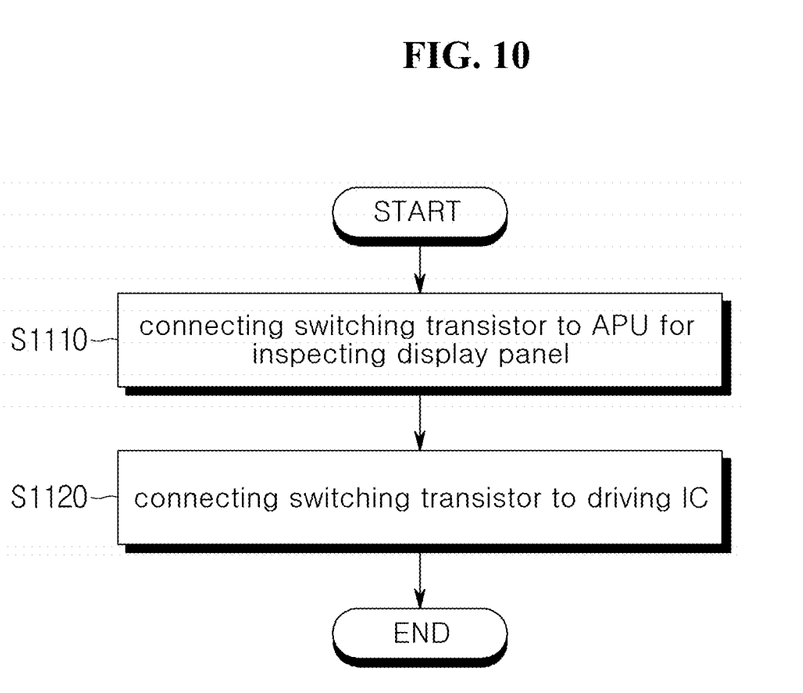
FIG. 10 is a flowchart showing the manufacturing method of the display panel according to the exemplary embodiment.

FIG. 10 is a flowchart showing a manufacturing method of a display panel according to the exemplary embodiment.

Referring to FIGS. 7 and 10, the manufacturing method of the display panel according to the exemplary embodiment may further include a step S1110 of inspecting the display panel by connecting the switching transistor 550 to the APU. Specifically, the method may include applying of the VCOM enable signal from the auto probe unit for array inspection of the display panel, and applying of the common voltage, supplied to the second signal line 420 by the switching transistor 550, from the auto probe unit.

The manufacturing method of the display panel according to the exemplary embodiment may further include a step S1120 of connecting the switching transistor 550 to the driving IC D-IC. More specifically, after inspecting the array of the display panel, the manufacturing method of the display panel may include connecting of the gate electrode of the switching transistor 550 and the driving IC D-IC to each other so that the VCOM enable signal is applied from the driving IC D-IC, and connecting of the source electrode of the switching transistor 550 and the driving IC D-IC to each other so that the common voltage to be supplied to the second signal line 420 by the switching transistor 550 is applied from the driving IC D-IC.

As described above, the display panel and the manufacturing method thereof according to various exemplary embodiments may solve the common voltage imbalance phenomenon occurring in the touch electrode by including the plurality of signal lines that provides the common voltage to the touch electrode.

The display panel and the manufacturing method thereof according to various exemplary embodiments have an economical benefit on the manufacturing process by composing the signal line of the display panel to be used for the AP array inspection.

It will be apparent to those skilled in the art that various modifications and variations can be made in the display panel and the method of manufacturing the same of the present disclosure without departing from the technical idea or scope of the disclosure. Thus, it is intended that the present disclosure cover the modifications and variations of this disclosure provided they come within the scope of the appended claims and their equivalents.

What is claimed is:

1. A display panel comprising:
   a touch electrode configured to receive a common voltage and including an electrode area and a dummy area;
   a first signal line disposed on the electrode area, connected to the touch electrode and configured to supply the common voltage applied by a driving IC to the touch electrode;
   a second signal line disposed on the dummy area;
   a plurality of dummy lines disposed on the dummy area and connected only to the touch electrode; and
   a switching transistor disposed on the dummy area and configured to supply the common voltage to the second signal line by being switched by an applied an enable signal,
   wherein the second signal line is configured to supply the common voltage to the touch electrode.

2. The display panel of claim 1, wherein
   the plurality of dummy lines are parallel to the first signal line.

3. The display panel of claim 2, wherein the touch electrode is divided into a first area and a second area by the plurality of dummy lines,
   wherein the second signal line is disposed in the first area to be parallel to the first signal line, and
   wherein the first signal line is disposed in the second area.

4. The display panel of claim 2, further comprising a plurality of second signal lines including the second signal line.

5. The display panel of claim 1, wherein
   the enable signal is configured to be applied from a driving IC, and
   the common voltage supplied to the switching transistor is configured to be applied from the driving IC.

6. The display panel of claim 1, wherein,
   when inspecting an array of the display panel by an auto probe unit,
   the enable signal is configured to be applied from the auto probe unit, and
   the common voltage supplied to the switching transistor is configured to be applied from the auto probe unit.

7. The display panel of claim 1, further comprising a connection line, and wherein the first signal line is electrically connected to the second signal line via the connection line.

8. The display panel of claim 1, wherein the second signal line includes at least one of the plurality of dummy lines.

9. A manufacturing method of a display panel, the method comprising:
   providing a touch electrode receiving a common voltage through an electrode and including an electrode area and a dummy area;
   providing a first signal line connected to the touch electrode and provided to supply the common voltage applied by a driving IC to the touch electrode, on the electrode area;
   providing a plurality of dummy lines provided to be connected only to the touch electrode, in the dummy area, and
   providing a switching transistor provided to supply the common voltage to a second signal line by being switched by an applied an enable signal,
   wherein the second signal line is configured to supply the common voltage to the touch electrode in the dummy area.

10. The manufacturing method of claim 9, wherein the second signal line includes at least one of the plurality of dummy lines.

11. The manufacturing method of claim 9, wherein the plurality of dummy lines are provided in parallel to the first signal line.

12. The manufacturing method of claim 11, wherein the touch electrode is divided into a first area and a second area by the plurality of dummy lines,
   wherein the second signal line is provided in the first area to be parallel to the first signal line, and
   wherein the first signal line is provided in the second area.

13. The manufacturing method of claim 11, wherein a plurality of second signal line is provided.

14. The manufacturing method of claim 9, further comprising:
   applying the enable signal from an auto probe unit that inspects an array of the display panel; and
   applying the common voltage, supplied to the second signal line by the switching transistor, from the auto probe unit.

15. The manufacturing method of claim 14, further comprising:
   after inspecting the array of the display panel,
   connecting the gate electrode of the switching transistor and the driving IC to each other so that the enable signal is applied from the driving IC; and connecting the source electrode of the switching transistor and the driving IC to each other so that the common voltage to be supplied to the second signal line by the switching transistor is applied from the driving IC.

16. The manufacturing method of claim 9, wherein the second signal line further includes a connection line connected to the first signal line.

* * * * *